Patented Apr. 23, 1940

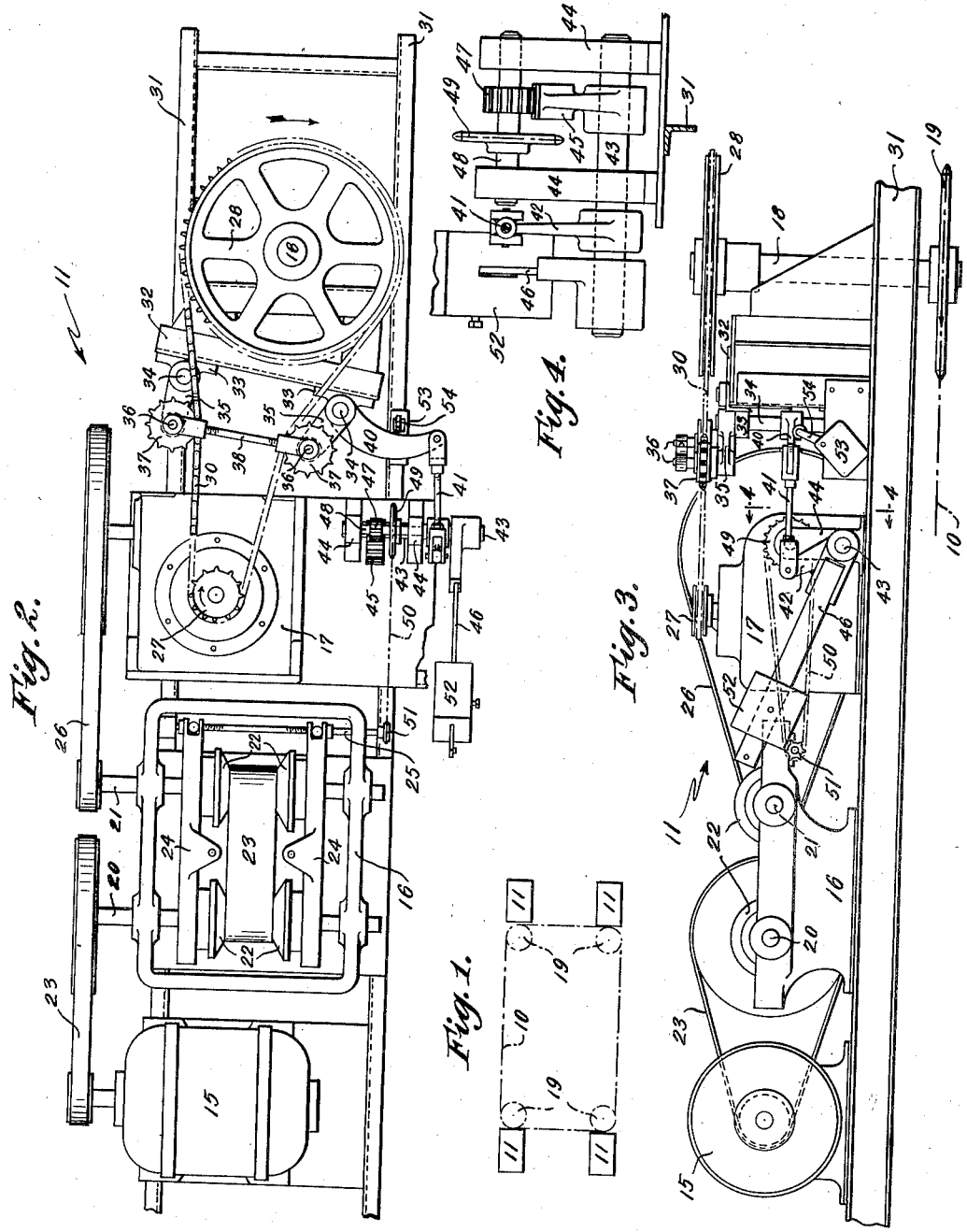

2,198,179

UNITED STATES PATENT OFFICE 2,198,179

CONVEYER

John E. Regan, Syracuse, N. Y., assignor to The Lamson Company, Syracuse, N. Y., a corporation of Massachusetts Application October 7, 1937, Serial No. 167,692

10 Claims. (Cl. 74—230.17)

This invention relates to an improvement in conveyers of the endless chain type and more particularly to the drive unit therefor. The endless chains are often several hundred feet in length and the driving load may be too great for a single drive unit so that several such units are required. Under such conditions it is essential to provide proper synchronism of the drive imparted and load carried by the several drive units.

The primary object of this invention is to provide in a conveyer drive unit automatic means for regulating the drive unit of the unit in response to the load carried and thereby to attain, in an installation wherein a chain is driven by a plurality of such units, proper synchronism between the units.

A further object of this invention is to provide a drive unit comprising a motor, a reduction unit, a gear box, a shaft driven by a belt from the gear box and means responsive to the tension of the belt for controlling the status of the reduction unit whereby the operation of the drive unit is regulated.

These and other objects will appear from an examination of the following description and of the accompanying drawing which forms a part thereof and in which:

Fig. 1 is a diagrammatic plan view of a conveyer wherein drive units embodying this invention are employed;

Fig. 2 is a plan view of a drive unit embodying this invention;

Fig. 3 is a side view thereof; and

Fig. 4 is an enlarged elevational view of a portion of such drive unit.

The conveyer illustrated diagrammatically in Fig. 1 comprises an endless chain 10 driven by a plurality of drive units 11. While the chain is shown as traveling in a rectangular path and the drive units are shown as at the corners of such path, it will be understood that this showing is merely illustrative and not limitative. Conditions often arise which decrease the load on some units and increase the load on other units, thus placing undue strains thereon and upsetting the synchronism which should be maintained between the units.

Each unit 11 comprises a drive motor 15, a reduction unit 16, a gear box 17 and a driven shaft 18 which carries a sprocket 19 in mesh with the endless chain 10. The reduction unit 16, shown as of the well-known Reeve type, comprises a pair of parallel shafts 20, 21 on which are slidably mounted opposed cones 22 keyed to rotate with the shafts. The shaft 20 is driven by the motor 15 through a belt 23 and suitable pulleys and the shaft 21 is driven by the shaft 20 through the cones 22 and a belt 23 resting thereon. By varying the spaces between the cones 22 and the engagement thereof with the belt the relative speeds of the shafts 20 and 21 can obviously be controlled. The corresponding cones on each shaft are moved longitudinally thereof by bars 24 centrally pivoted and actuated simultaneously by the rotation of the shaft 25. As shown on Fig. 2 the rotation of the shaft 25 causes the cones on one shaft to approach each other and, at the same time, the cones on the other shaft to separate whereby the speed of the shaft 21 can be regulated relative to the speed of the shaft 20. The gear box 17 is driven from the shaft 21 by a belt 26 through suitable pulleys and drives, through gearing not shown, a sprocket 27. The drive of the sprocket 27 is imparted to the drive shaft 18 through a sprocket 28 thereon and a chain 30 passed around both sprockets.

The status of chain 30 reflects the status of the conveyer chain 10 and advantage is taken thereof to regulate the operation of the drive unit. The sprockets 27 and 28 are rotated clockwise on Fig. 2 as indicated by the arrows thereon. Thus an increase in the load causes an increase in the tension on the chain 30 as it travels from the sprocket 28 to the sprocket 27, while the reverse takes place upon a decrease of the load.

Rigidly mounted upon the base beams 31 of the unit is a standard 32 which supports bearings 33 for rock shafts 34. Fixed to each shaft 34 is an arm 35 which carries a stub shaft 36 on which an idler sprocket 37 rotates freely in mesh with the chain 30. An adjustable bar 38 connects the stub shafts 36 and holds them at a predetermined distance apart, so that both sprockets 37 rest upon the adjacent runs of the chain 30. Secured to one shaft 34 is an arm 40 connected by a link 41 to one end of an arm 42 fixed at its other end to a rock shaft 43. The shaft 43 is suitably mounted in bearings 44 carried by a plate supported on the beams 31 and carries adjacent one end a segment rack 45 and at the other end an arm 46. The rack 45 is in mesh with a pinion 47 fixed to a shaft 48 parallel to the shaft 43 and also carried by the bearings 44. Mounted on the shaft 48 is a sprocket 49 which is connected by a chain 50 with a sprocket 51 on the shaft 25 of the reduction unit 16. A weight 52 adjustable on the arm 46 serves as a counterweight to hold the various elements of the regulating means normally in a predetermined condition. Mounted on the frame is a circuit breaker 53 having an arm 54 which extends into the path of travel of the arm 40 and will be tripped thereby under conditions to be set forth below.

From the above it will be noted that the sprockets 37 are yieldably held in position by the weight 52 acting on one of the shafts 34 through arm 46, shaft 43, arm 42, link 41 and arm 40. The various elements are set for the normal load to be exerted by the drive chain 30. Should that load increase, the drive run of the chain from the sprocket 27 tends to straighten, thus shifting the sprocket arms 35 and turning the shafts 34 counterclockwise (Fig. 2). Thereby the shaft 43 is, through arm 40, link 41 and arm 42, rotated clockwise (Fig. 3) and, through the rack 45 and the pinion 46, the shaft 48 is rotated counterclockwise. The rotation of the shaft 48 is transmitted to the shaft 25 of the reduction unit 16, through sprocket 49, chain 50 and sprocket 51, whereupon the cones 22 are shifted to reduce the speed of the drive sprocket 27. It will be noted that the operation of the regulating elements is controlled by the tension of the drive run of the chain 30. The sprocket 37 in mesh with the opposite run merely serves as an idler. If, however, the load decreases, the drive run of the chain from the sprocket 28 to the sprocket 27 tends to slacken, the shafts 34 and 43 are rotated clockwise by the weight 42, and the shaft 43 is rotated counterclockwise so that the cones are shifted to increase the speed of the drive sprocket 27. In addition to the regulating function of this device, it serves also to stop the operation of the drive in case of a substantial overload. Should the increase in the load be excessively large, the arm 40 will be caused to travel far enough to trip the arm 54 of the circuit breaker 53 and thereby open the motor circuit and stop the operation of the drive unit. In case of a multiple drive the motors of all the drive units are fed from the same circuit so that the tripping of the circuit breaker of any unit will stop all the units of the drive.

Should the sprocket 28 be driven counterclockwise, the arms 42 and 46 would be shifted from the positions shown in Fig. 3 to corresponding positions at the other side of the vertical plane of the shaft 43 and the circuit breaker 53 shifted so that it would be tripped upon movement of the arms 40 in the clockwise direction (Fig. 2). The weight 52 would then act to hold the sprocket 37 supported by that shaft 34 to which the arm 40 is secured against the opposite run of the belt. The device so adapted will function in the manner previously described to regulate the speed of the drive shaft and to stop the drive in case of an excessive overload.

I claim:

1. A drive unit for an endless conveyer chain, such unit comprising a drive shaft, a sprocket carried thereby in mesh with said chain, means for driving said shaft including a source of power, a chain, and a reduction unit through which power from said source is exerted through said chain to drive said shaft, said drive chain reflecting the status of the conveyer chain, and means including an element in contact with one run of the drive chain and actuated thereby for regulating the speed of the conveyer chain.

2. A drive unit for an endless conveyer chain, such unit comprising a drive shaft, a sprocket carried thereby in mesh with said chain, means for driving said shaft including a source of power, a chain, and a reduction unit through which power from said source is exerted through said chain to drive said shaft, said drive chain reflecting the status of the conveyer chain, said reduction unit being adjustable to regulate the speed of the conveyer chain, and means including an element in contact with one run of the drive chain and actuated thereby to adjust said reduction unit.

3. A drive unit for an endless conveyer chain, such unit comprising a drive shaft, a sprocket carried thereby in mesh with said chain, means for driving said shaft including a source of power, a reduction unit driven by said source of power, a gear box driven by said reduction unit, means including a chain by which said drive shaft is driven by said gear box, and means including an element in contact with one run of the drive chain and actuated thereby in response to the tension thereof for adjusting said reduction unit to regulate the speed of said drive shaft.

4. A drive unit for an endless conveyer chain, such unit including a drive shaft, a sprocket on said shaft in mesh with said chain, means including a chain for driving said shaft, and means including an element in contact with one run of the drive chain and actuated thereby in response to the tension thereof to regulate the speed of the drive shaft driving means.

5. A drive unit for an endless conveyer chain, such unit including a drive shaft, a sprocket on said shaft in mesh with said chain, means including a chain for driving said shaft, and means including idler sprockets in mesh with the drive chain and shifted laterally in response to the change in tension of the drive chain to regulate the speed of the drive shaft driving means.

6. A drive unit for an endless conveyer chain, such unit including a drive shaft, a sprocket on said shaft in mesh with said conveyer chain, means including a chain for driving said shaft, and means including two idler sprockets in contact with opposite runs of the drive chain, stub shafts on which said idler sprockets are supported, a bar connecting said stub shafts to hold the idler sprockets a predetermined distance apart, pivotally mounted arms on which said stub shafts are supported, said arms being oscillated by a change in tension of the drive chain, and means actuated by one of said arms to regulate the speed of the drive shaft driving means in accord with the change in tension of the drive chain.

7. A drive unit for an endless conveyer chain, such unit including a drive shaft, a sprocket on said shaft in mesh with said chain, shaft driving means including a chain and a reduction unit, and means to regulate the speed of the shaft driving means, said regulating means including an element in contact with one run of the drive chain and actuated by the tension thereof and acting upon said reduction unit.

8. A driven unit for an endless chain including a drive shaft, a sprocket on said shaft in mesh with said chain, shaft driving means including a chain and a reduction unit, means acting upon the reduction unit to regulate the speed of the shaft driving means, said regulating means including a movable element in contact with one run of the drive chain and actuated by the tension thereof, and means for stopping the driving means, such means being actuated by said element when said conveyer chain is overloaded.

9. A drive unit for an endless chain including a drive shaft, a sprocket on shaid shaft in mesh with said chain, shaft driving means including a chain and a reduction unit, means acting upon the reduction unit to regulate the speed of the shaft driving means, said regulating means including a movable element in contact with one run of the drive chain and actuated by the tension thereof, and means for stopping the driving means, such means being actuated by said element when the tension of the driving chain increases beyond a predetermined amount.

10. A drive unit for an endless chain including a drive shaft, a sprocket on said shaft in mesh with said chain, shaft driving means including a chain and a reduction unit, means acting upon the reduction unit to regulate the speed of the shaft driving means, said regulating means including a movable element in contact with one run of the drive chain and actuated by the tension thereof, and means for stopping the driving means, such means comprising an arm connected to said element and movable in unison therewith, and a circuit breaker, the circuit breaker being so positioned relative to the arm that it is tripped by the arm when the latter is moved by the element in response to an increase in tension of the driving chain beyond a predetermined amount.

JOHN E. REGAN.